(12) United States Patent
Digonnet et al.

(10) Patent No.: US 6,385,354 B1
(45) Date of Patent: May 7, 2002

(54) ELECTROSTRICTIVE FIBER MODULATORS

(75) Inventors: Michel J. F. Digonnet, Palo Alto; Alice Liu; Gordon S. Kino, both of Stanford, all of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/259,832

(22) Filed: Mar. 1, 1999

Related U.S. Application Data
(60) Provisional application No. 60/106,424, filed on Oct. 31, 1998, and provisional application No. 60/106,682, filed on Nov. 2, 1998.

(51) Int. Cl.[7] .............................. G02F 1/01; G02F 1/035
(52) U.S. Cl. .............................. 385/3; 359/240; 359/279
(58) Field of Search ........................ 385/2, 3, 4; 324/96, 324/244.1; 250/227.14, 227.19, 227.21, 227.27; 359/238–240, 237, 279

(56) References Cited

U.S. PATENT DOCUMENTS

| | | | |
|---|---|---|---|
| 4,560,234 A | | 12/1985 | Shaw et al. |
| 4,877,298 A | | 10/1989 | Teng et al. |
| 4,936,644 A | | 6/1990 | Raskin et al. |
| 5,383,048 A | * | 1/1995 | Seaver ........................ 359/279 |
| 5,396,166 A | * | 3/1995 | Vohra ........................... 324/96 |
| 5,966,233 A | * | 10/1999 | Fujiwara ..................... 359/240 |
| 6,008,927 A | | 12/1999 | Minemoto et al. |

OTHER PUBLICATIONS

Deposition of oriented zinc oxide on a optical fiber, B.L. Heffner and B.T. Khuri–Yakub, Appl. Phys. Lett. 48(21), May 26, 1986.

Piezoelectrically Induced Optical Phase Modulation of Light in Single–Mode Fibers, Masaaki Imai, Takashi Yano, Kazushi Motoi and Akira Odajima, IEEE Journal of Quantum Electronics, vol. 28, No. 9, Sep. 1992.

Relationship between nonlinear electrostrictive Kerr effects and acousto–optics, Monte Khoshnevisan and Pochi Yeh, SPIE vol. 739 Phase Conjugation; Beam Combining and Diagnostics (1987).

Large second–order nonlinearity in poled fused silica, R.A. Myers, M. Mukherjee, S.R.J. Brueck, Optics Letters/vol. 16, No. 22 Nov. 15, 1991.

(List continued on next page.)

*Primary Examiner*—Frank G. Font
*Assistant Examiner*—Michael P. Mooney
(74) *Attorney, Agent, or Firm*—Knobbe, Martens, Olson & Bear, LLP

(57) ABSTRACT

An apparatus modulates the phase of an optical signal. The apparatus includes an optical medium for propagating the optical signal. At least one electrode is positioned in proximity with the medium. The electrode induces an electric field within the medium in response to an AC voltage to produce variations in the index of refraction of the optical medium through the electrostrictive effect. Preferably, the phase of the optical signal is modulated such that polarization components of the optical signal parallel to and orthogonal to the electric field experience an equal phase shift. In certain embodiments, a DC voltage is supplied to the optical medium. Alternatively, the DC voltage within the optical medium may arise from (or be enhanced by) poling the optical medium. Certain embodiments of the present invention include two electrodes positioned on opposite sides of the optical medium. The apparatus is advantageously used in an interferometer to form a device that modulates the amplitude of the optical signal. The apparatus may also be used in an interferometer to form an optical switching device.

42 Claims, 5 Drawing Sheets

OTHER PUBLICATIONS

Photoelastic In–Fiber Birefringence Modulator Operating at the Fundamental Transverse Acoustic Resonance. I. Abdulhalim, C.N. Pannell, IEEE Photonics Technology Letters, vol. 5, No. 10, Oct. 1993.

Optical fibre electrets; observation of electro–acousto–optic transduction, P.G. Kazansky, P.St.J. Russel, C.N. Pannell, Electronics Letters, Aug. 18, 1994, vol. 30, No. 17.

Thermally poled glass: frozen–in electric field or oriented dipoles?, P.G. Kazansky, P.St.J. Russel, Optics Communication 110 (1994) p. 611–614.

Optical fibre electrets and electro–acousto–optic transduction, $10^{th}$ Optical Fibre Sensors Conference, Oct. 1994.

Electro–Optic Effect Induced by UV–Excited Poling in a Silica Fibre, T. Kujiwara, D. Wong, Y. Zhao, S. Fleming, S. Poole, M. Sceats, $19^{th}$ Australian Conference, Optical Fibre Technology, Paper PDP–3, 1994.

A Poled Electrooptic Fiber, X.C. Long, R.A. Myers, S.R.J. Brueck, IEEE Photonics Technology Letters, vol. 8, No. 2, Feb. 1996.

Method of Testing Optical Fibers and Material for Use as Phase Modulators and Switches, Michel Digonnet, Alice Liu, Gordon Kino, U.S. Patent Application Serial No. 08/908,353 filed on Aug. 7, 1997.

Bragg Gratings, Photosensitivity, and Poling in Glass Fibers and Waveguides: Applications and Fundamentals, A.C. Liu, D. Pureau, M.J.F. Digonnet, G.S. Kino, $12^{th}$ Internaitonal Conference on Optical Materials Division (GOMD) Meeting; Oct. 26–28, 1997.

Direct measurement of electrostriction in optical fibers, A. Melloni, M. Frasca, A. Garavaglia, A. Tonini, M. Martinelli, May 1, 1998, vol. 23, No. 9, Optics Letters.

\* cited by examiner

ELECTROSTRICTIVE FIBER MODULATORS

REFERENCE TO RELATED APPLICATIONS

This application claims the benefit of U.S. Provisional Application No. 60/106,424 filed Oct. 31, 1998 and U.S. Provisional Application No. 60/106,682 filed Nov. 2, 1998.

BACKGROUND OF THE INVENTION

1. Field of the Invention

The present invention relates to optical modulators and switches, and in particular, fiber-based optical modulators and switches.

2. Description of the Related Art

Presently, only a few kinds of phase modulators operating in the MHz frequency range are commercially available. For example, the electro-optic lithium niobate modulator can be designed to operate up to many hundreds of GHz. Lithium niobate modulators are relatively compact (a few cm in length), and require only a few volts when they are constructed in waveguide form and a few hundreds of volts when they are in bulk-optic form. On the other hand, they exhibit a fairly high internal loss of at least 1 dB, as well as coupling losses of at least 0.5 dB per port. Thus, the fiber-to-fiber loss of a pigtailed lithium niobate modulator is at least 2 dB, and in many products it is considerably higher. Also, the cost of these devices is high, typically a few thousand dollars. Furthermore, in the case of bulk-optic lithium niobate modulators, the voltage required is on the order of a few hundred volts when operating at multi-megahertz frequencies. This voltage requirement is met by a resonant electronic circuit that boosts a low input voltage signal of a few volts, but such a circuit generally has a limited bandwidth of typically around 1 MHz, so that the modulator operates over a narrow frequency range.

Another kind of high-frequency phase modulator is a piezoelectric (PZT) ring modulator. In this device, a fiber that is typically a few meters in length is wound around a PZT ring. When an AC voltage is applied to the ring, the ring expands and contracts periodically, thereby stretching the fiber, which then modulates the phase of an optical signal traveling through the fiber. While this type of modulator required only a few volts, it produces a useful phase shift (typically around π) at only at a few discrete frequencies corresponding to the mechanical resonant frequencies of the ring. Thus, the bandwidth of this device is also limited.

A third type of phase modulator is the acousto-optic (A/O) fiber modulator, in which a fiber is coupled mechanically to a PZT modulator, which compresses it periodically. (See, for example, I. Abdulhalim, and C. N. Pannell, "Photoelastic in-fiber birefringence modulator operating at the fundamental transverse acoustic resonance," IEEE Photon. Techno. Lett. vol. 5, no. 10, pp. 1197–1199, October 1993.) This type of modulator is also driven by a resonant electronic circuit, so that its bandwidth is generally limited to on the order of 1 MHz. An A/O modulator may require 0.7 W of input power to produce a phase modulation of π/2. Also, A/O fiber modulators in which the fiber is coated with a thin PZT film have been demonstrated at Stanford University. While A/O fiber modulators work well, they only operate at discrete resonant frequencies and require a fairly high input electrical power.

For all of these modulators, a signal of one polarization traveling through the device will undergo a phase modulation that is significantly different from a signal having the orthogonal polarization. This polarization dependence is highly undesirable in many applications, because the polarization of an input signal is generally not constant but rather drifts unpredictably over time.

Although there exists a variety of optical fiber components such as filters, amplifiers, couplers, and lasers, all-fiber optical modulators and switches with suitable characteristics are presently not readily available. Such devices would be useful in fiber sensors, fiber sensor arrays, optical communication systems, and fiber and waveguide devices such as lasers.

SUMMARY OF THE INVENTION

One aspect of the present invention is an apparatus for modulating the phase of an optical signal. The apparatus comprises an optical medium for propagating the optical signal, as well as first and second electrodes proximate to the optical medium. The first and second electrodes have an AC voltage imposed therebetween which causes strains in the optical medium which, via the electrostrictive effect, produce variations in the index of refraction of the optical medium. In one preferred embodiment of the invention, the optical medium is unpoled, and the electrodes may apply a DC voltage in addition to the AC voltage. The phase of the optical signal may be modulated such that polarization components of the optical signal parallel to and orthogonal to the electric field experience an equal phase shift. The apparatus is advantageously incorporated into an interferometer to form a device that modulates the amplitude of the optical signal. Alternatively, the apparatus is incorporated into an interferometer to form an optical switching device.

Another aspect of the present invention is an apparatus for modulating the phase of an optical signal, in which the apparatus comprises a poled optical medium for propagating the optical signal. The poled optical medium has an internal DC field. At least one electrode is positioned in proximity to the medium. The electrode has an AC voltage applied thereto to induce an AC electric field within the medium to produce variations in the index of refraction of the optical medium through the electrostrictive effect. In one preferred embodiment, the phase of the optical signal is modulated such that polarization components of the optical signal parallel to and orthogonal to the electric field experience an equal phase shift. The apparatus is advantageously incorporated into an interferometer to form a device that modulates the amplitude of the optical signal. Alternatively, the apparatus is advantageously incorporated into an interferometer to form an optical switching device.

Another aspect of the current invention is a method of modulating the phase of an optical signal by providing an optical medium, applying an AC voltage to produce an electric field within the optical medium, producing variations in the index of refraction of the optical medium through the electrostrictive effect by causing strains in the optical medium, and passing an optical signal through the optical medium to modulate the phase of the optical signal. In a preferred embodiment of this method, the AC voltage is applied to first and second electrodes, in which the electrodes are in proximity to the optical medium. In another preferred embodiment of this method, the AC voltage is applied at a frequency such that polarization components of the optical signal parallel to and orthogonal to the electric field experience an equal phase shift as the optical signal passes through the optical medium. Output from the optical medium may be directed into an interferometer to modulate the amplitude of the optical signal, or to switch the optical signal from a first output port of the interferometer to a second output port of the interferometer.

BRIEF DESCRIPTION OF THE DRAWINGS

The present invention will be described below in connection with the attached drawing figures, in which.

DETAILED DESCRIPTION OF THE PREFERRED EMBODIMENTS

Figure 1:
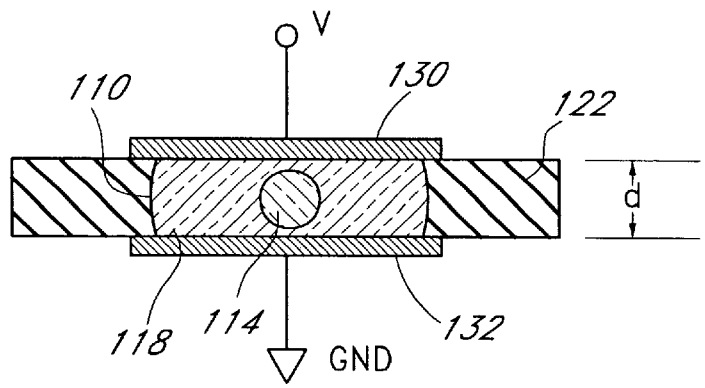
FIG. 1 illustrates an electrostrictive modulator in accordance with one embodiment of the present invention.

Several embodiments of the invention are described herein, in which the electrostrictive effect in a fiber or a waveguide is used to generate a large index modulation at certain mechanical resonant frequencies with only a modest voltage. In addition, at certain operating frequencies, the induced phase modulation is independent of the polarization of the input signal. These resonances are used to design all-fiber-based optical components, such as modulators and switches. Compared to existing commercial phase modulators, which are generally based on electro-optic crystals such as lithium niobate, these fiber-based components include the following advantages: (1) extremely low internal loss, e.g., much less than 0.01 dB; (2) low-loss splices to single-mode communication fibers; and (3) broadband transmission range, from the ultraviolet (UV) to the infrared (IR).

In several embodiments of the present invention, an electric field (e.g., a voltage) is applied directly to a fiber (or another form of an optical waveguide) to induce a change in the index of refraction, thereby modulating a signal traveling in the waveguide. The refractive index of most optical materials can be changed by the application of an electric field via, for example, the Kerr effect or the electrostrictive effect. In the current invention, the electrostrictive effect is utilized to produce a phase modulation in a glass or another material, with the magnitude of the phase modulation induced by the electrostrictive effect substantially exceeding that induced by the Kerr effect at certain frequencies.

With the electrostrictive effect, an AC electric field of frequency ν applied to a material subjects the material to a periodic stress. This stress produces strain (relative deformation) within the material, i.e., the material compresses and expands periodically in response to the field, at the frequency ν. As a result of this periodic change in the density of the material, the material's refractive index, which is related to the density, also changes, in particular, at twice the applied frequency, 2ν. Thus, an optical signal traveling through the material is subjected to a phase modulation at 2ν, and the amplitude of this modulation is proportional to the square of the applied voltage, $V_m^2$. If a DC voltage $V_{dc}$ is applied in addition to the AC voltage, the resulting phase modulation is proportional to the product $V_m V_{dc}$, and the modulation occurs at a frequency ν.

When a material is subjected to a stress, the strain is greatly enhanced at certain frequencies corresponding to mechanical resonances of the material. At these frequencies, the deformation of the material is increased, as is the modulation of its index of refraction. Thus, a spectrum of the phase modulation (as a function of frequency) induced by the electrostrictive effect typically exhibits a series of sharp peaks, or resonances. These resonance frequencies are determined by the physical shape and dimensions of the sample. For example, for a slab of thickness d, the fundamental resonance frequency is given by $v_0 = v/(2d)$, where v is the speed of sound in the material. The spectra will thus exhibit resonances at $v_0$ and at higher harmonics (odd multiples of $v_0$), and will exhibit other resonances related to other dimensions of the sample and other types of acoustic waves. For silica, the longitudinal wave velocity v=5.95 km/s, so that in a fiber of diameter d=125 μm, the fundamental resonance is about 24 MHz. (See, for example, I. Abdulhalim, and C. N. Pannell, supra.)

FIG. 1 shows one embodiment of the invention. A fiber 110 comprising a core 114 surrounded by a cladding 118 is imbedded in an electrical insulator 122. The insulator 122 may be polyimide or another material having a high dielectric breakdown voltage. The fiber 110/insulator 122 combination is polished down to a small thickness d, e.g., 30 μm, and sandwiched between oppositely facing electrodes 130 and 132. A sinusoidal voltage at frequency ν (i.e., $V = V_m \sin 2\pi\nu t$) is applied to one of the electrodes 130, with the other electrode 132 being tied to ground.

Based on experimental measurements described below, this embodiment should produce a phase modulation of π at twice the fundamental frequency (i.e., at nearly 200 MHz), for a modulation voltage $V_m$=350 V, a thickness d=30 μm, and an electrode length (the dimension extending into and out of the page) L=24 cm. Under these conditions, the electric field applied to the structure is 350 V/30 μm=11.6 V/μm. This exceeds the electric field breakdown of air at room temperature, which is the reason for using the insulator 122. Alternatively, a DC voltage may be applied in addition to the AC voltage, i.e., $V = V_{dc} + V_m \sin 2\pi\nu t$. For d=30 μm and L=24 cm, a phase modulation of π will be produced at the fundamental frequency of 99.3 MHz when $V_m$=10 V and $V_{dc}$=3,000 V.

Figure 2A:
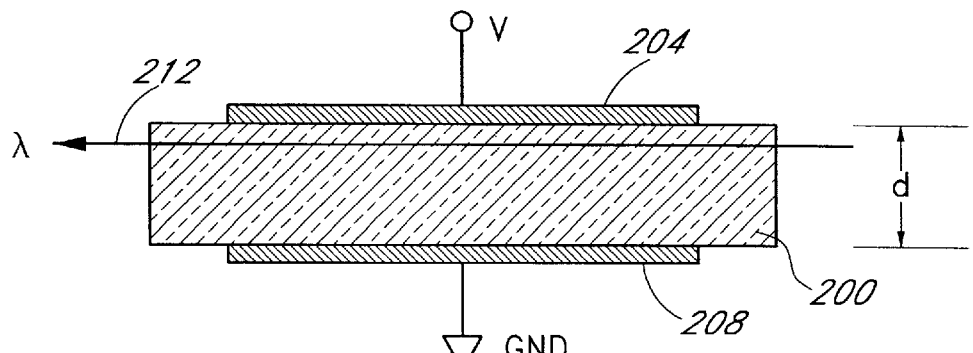
FIG. 2A illustrates an electrostrictive modulator in accordance with another embodiment of the present invention utilizing a poled optical medium.

Another embodiment of the invention is illustrated in FIG. 2A. An optical medium 200 such as bulk optic silica (e.g., high purity Infrasil) or an optical fiber polished as shown in FIG. 1 is placed between two electrodes 204 and 208, in which a permanent electric field has been previously induced in the silica. This may be advantageously accomplished by "poling", wherein the silica is brought to an elevated temperature and then subjected to a strong electric field. After the silica is cooled, the applied electric field is turned off, but an induced electric field remains in the silica. (See, for example, R. A. Myers, N. Mukerjhee, and S. R. J. Brueck, "Large Second-Order Nonlinearity in Poled Fused Silica," Opt. Lett. 16, no. 22, 1732–1734, November 1991, and A. C. Liu, D. Pureur, M. J. F. Digonnet, and G. S. Kino, "Improving the nonlinearity of silica by poling at higher temperature and voltage," Optical Society of America Conference, Williamsburg, Va., November 1997, Paper BTuCS, pp. 302–304.) Alternatively, the silica may be exposed to intense UV light (instead of elevated temperatures) and a high voltage. (See, for example, T. Fujiwara et al., "Electro-Optic Effect Induced by UV-Excited Poling in a Silica Fibre," 19th Australian Conference on Optical Fibre Technology, Paper PDP-3, 1994.)

Measurements made in connection with the poled silica embodiment suggest that this induced field extends about 15 $\mu$m beneath the poling anode, and that its strength can be estimated to be about 350 V/$\mu$m, which is still less than the breakdown field of high purity silica (as high as 1,000 V/$\mu$m). Thus, this built-in internal field may advantageously replace an externally applied DC field. Because this DC field is close (within approximately 15 $\mu$m) to the electrode 204, the optical signal 212 must traverse the silica 200 near the electrode 204, as shown in FIG. 2A. Based on the measured phase shift at resonance in FIGS. 3A and 3B, and given an internal field of 350 V/$\mu$m, a phase modulation of $\pi$ at a modulation frequency of 24 MHz is predicted in a device having a length L=10 cm and a modulation voltage $V_m$=30 V. Similar properties prevail if the silica wafer of FIG. 2A is replaced by a poled optical fiber, insulated and polished as shown in FIG. 1.

The poled fiber device of this embodiment requires a relatively low operating voltage and consumes very little electrical power. Also, it has a negligible optical internal loss. (The internal fiber loss at 1.55 82 m is typically less than 0.5 dB/km.) Splicing to another unpoled fiber adds only about 0.03 dB loss per splice. Thus, the total fiber-to-fiber loss of a poled fiber device is preferably less than 0.07 dB. This is to be contrasted with a commercially available bulk-optic lithium niobate phase modulator which may require about 200 V to produce a phase modulation of $\pi$ at a given frequency (for example 5 MHz with a bandwidth of 1 MHz), and typically exhibits a fiber-to-fiber transmission loss of several dB.

Figure 2B:
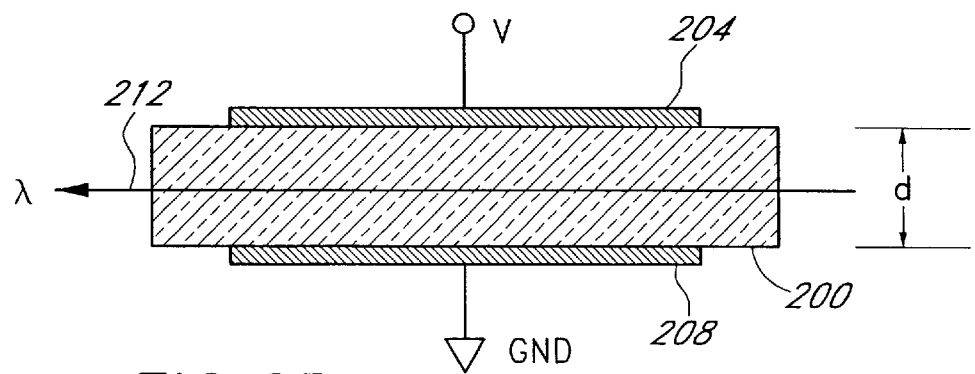
FIG. 2B illustrates a bulk electrostrictive modulator in accordance with another embodiment of the present invention.
Figure 3A:
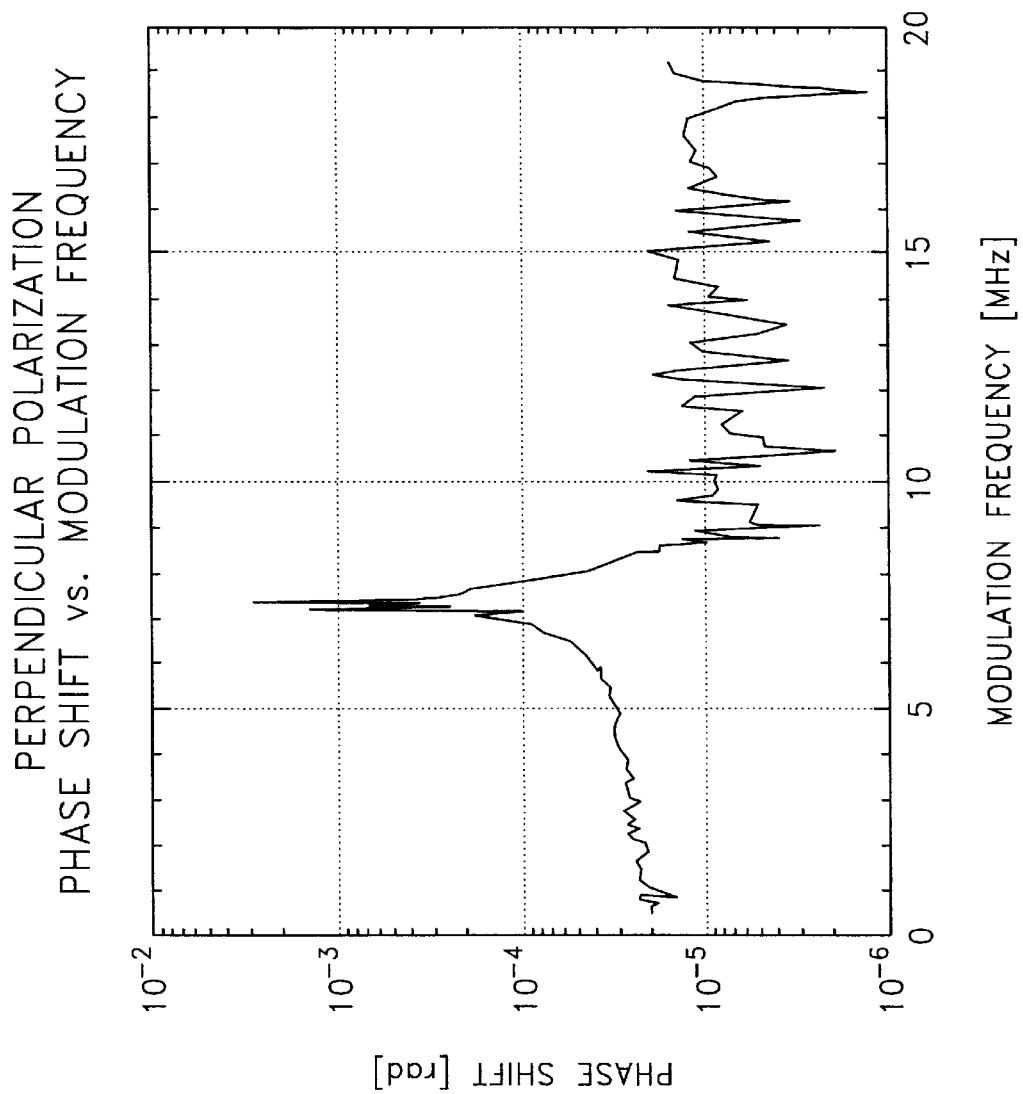
FIG. 3A illustrates a graph of the phase shift versus modulation frequency for perpendicular polarization of the laser applied to the embodiment of FIG. 2.
Figure 3B:
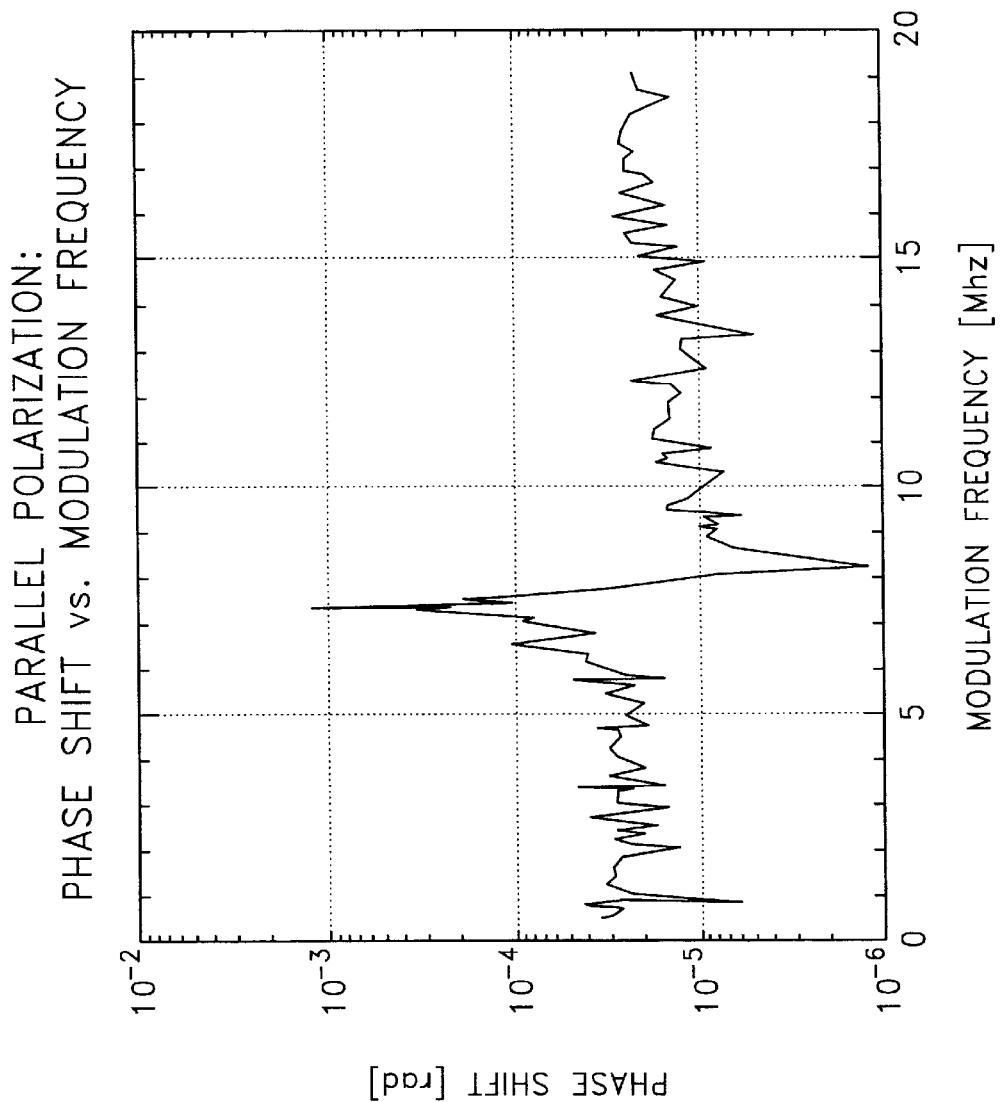
FIG. 3B illustrates a graph of the phase shift versus modulation frequency for parallel polarization of the laser applied to the embodiment of FIG. 2.

One embodiment that has been reduced to practice is now discussed with particular reference to FIGS. 2B, 3A, and 3B. A slab of silica 200, which was unpoled, has a thickness d=406 $\mu$m. The electrodes 204 and 208 are 0.3 $\mu$m thick layers of chromium/gold. An optical signal is supplied by a cw laser beam 212 operating at 633 nm. The beam 212 is directed through the silica 200 between the electrodes 204 and 208. A modulation voltage $V_m$=15 V and a DC voltage $V_{dc}$=2220 V are applied to the electrodes 204 and 208. The applied AC frequency is varied between 0.5 and 19 MHz, and the modulation imparted to the optical signal is measured with a Mach-Zehnder interferometer (not shown).

FIGS. 3A and 3B show logarithmic plots of the measured phase modulation of the laser beam 212 as a function applied frequency $\nu$ for laser beam polarizations that are perpendicular and parallel to the applied electric field, respectively. The usual convention has been adopted in which the polarization of the laser beam is taken to be the orientation of the beam's electric field. For both polarizations, a very strong resonance exists at 7.35 MHz, with $\Delta\phi_{perp}$=2 mrad and $\Delta\phi_{par}$=0.9 mrad at this frequency, where $\Delta\phi_{perp}$ and $\Delta\phi_{par}$ are the phase modulation of the perpendicular and parallel polarizations, respectively. This resonant frequency corresponds exactly to the fundamental frequency of the device, which is calculated to be $\nu_0$=v/(2d)=7.34 MHz. The resonance is quite narrow (about 20 kHz, corresponding to a bandwidth of 0.2%), with the resonant phase modulations of the perpendicular and parallel polarizations being enhanced by a factor of about 100 over non-resonant frequencies.

FIGS. 3A and 3B show that while both the parallel polarization spectrum and the perpendicular polarization spectrum generally exhibit resonances at the same frequencies, these two spectra are not proportional to each other. The reason for this is that the induced phase shift rises from at least two different factors, namely, the Kerr effect and the electrostrictive effect. Each mechanism exhibits its own magnitude, frequency dependence, and polarization dependence. In the frequency region shown, the Kerr effect contributes to a roughly constant, nearly frequency-independent phase modulation for each of the two polarizations. However, the magnitude of the phase modulation induced by the Kerr effect for the parallel polarization ($\Delta\phi_{Kpar}$) is different from that induced for the perpendicular polarization ($\Delta\phi_{Kperp}$) Since the optical medium 200 is isotropic and the Kerr effect arises from a third-order nonlinearity, it can be shown from Kleinman symmetry considerations that the ratio $b_K$ of the Kerr effect induced polarizations is $b_K=\Delta\phi_{Kperp}/\Delta\phi_{kpar}=\frac{1}{3}$.

On the other hand, the electrostrictive effect does lead to resonances for the reasons discussed previously, and is responsible for the prominent peaks in FIGS. 3A and 3B. The spectra of FIGS. 3A and 3B indicate that near the resonances at 7.35 MHz: (1) the phase shift arising from the Kerr modulation is much smaller than the phase shift arising from the electrostrictive modulation, and (2) the phase shift arising from the electrostrictive modulation is stronger for the perpendicular polarization than for the parallel polarization, i.e., the ratio be of these two components ($b_E=\Delta\phi_{Eprep}/\Delta\phi_{Epar}$) is greater than 1.

The ratio $b_E$ was deduced from the data of FIGS. 3A and 3B by dividing the ratio of the peak phase shift at the resonance of the perpendicular polarization by the peak phase shift at the resonance of the parallel polarization. This procedure is used because at resonance, as discussed above, the electrostrictive phase shift is considerably larger than the Kerr phase shift. Therefore, the ratio of measured resonant phase shifts is substantially equal to the ratio of $\Delta\phi_{Eperp}$ to $\Delta\phi_{Epar}$, which is equal to $b_E$. The empirically determined value of $b_E$ is approximately 2.2. Although this value differs substantially from recently published work (see A. Melloni et al., "Direct measurement of electrostriction in optical fibers," *Opt. Lett.* 23, no. 9, pp. 691–693, May 1998, in which $b_E$ was stated to be equal to 1), the value of 2.2 is consistent with the ratio of the elasto-optic (or photoelastic) coefficients of silica for the two polarizations, which is equal to 2.23. In fact, it can be shown from physical considerations that $b_E$ and this ratio of elasto-optic coefficients should be equal. Given that 1) $b_K=\frac{1}{3}$ and the Kerr effect contributes to a roughly constant, nearly frequency-independent phase modulation for each of the two polarizations, and that 2) $b_E$ is greater than 1 and the phase shift arising from the electrostrictive modulation has strong resonances, it follows that the spectrum of FIG. 3A and the spectrum of FIG. 3B are not proportional. In fact, the relative magnitude of the Kerr effect and the electrostrictive effect in the particular sample tested is such that the spectra measured intersect at certain frequencies. At these frequencies, the two polarizations experience the same phase modulation. In other words, a polarization independent modulator or switch can be fabricated by operating at any of the frequencies where the spectra cross. Unfortunately, because $b_E$ is so much larger than unity, these crossing frequencies do not occur at the resonance peaks, but rather slightly away from resonance where the phase modulation is weaker.

The optical medium of the embodiments disclosed herein is not restricted to silica, but may include other materials (such as polymers and other glasses) and optical forms other than optical fiber (such as an optical waveguide). Many materials in fact exhibit greater electrostrictive constants than silica. Such a material can be applied as a coating between the fiber 200 (or waveguide) and one (or both) of the electrodes 204, 208 to more efficiently translate the applied electric field into stress within the fiber 200. This arrangement effectively reduces the voltage and/or length of the fiber 200 required for a working device.

Figure 4:
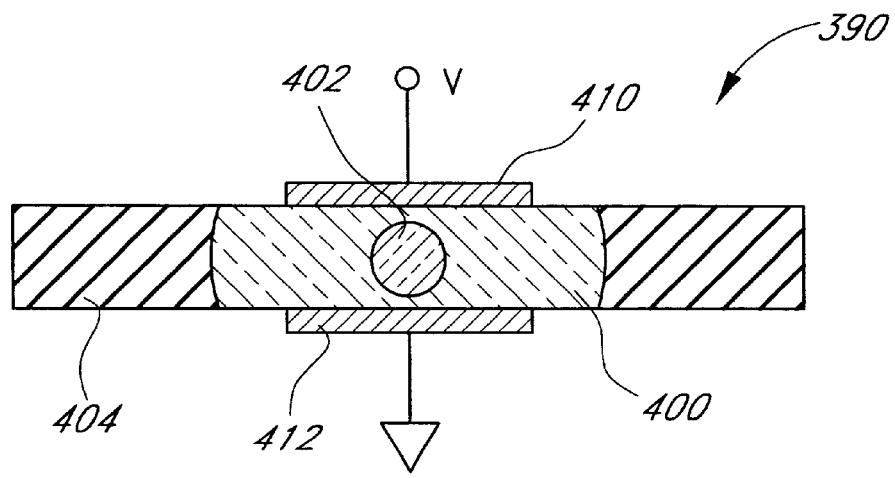
FIG. 4 illustrates an alternative embodiment of the present invention utilizing a polished fiber.

Another embodiment of a phase modulator 390 is shown in FIG. 4. To fabricate this device, a fiber 400 which includes a core 402 is imbedded in an electrical insulator 404 such as a polymer (e.g., a polyimide), and then the fiber 400 is polished on both sides until it is very thin, for example, until only a few microns of glass remain on each side of the fiber core 402. (See S. Brueck et al., "A poled electrooptic fiber," IEEE Photonics Technology Letters Vol. 8, no. 2, 227–229, February 1996.) Electrodes 410, 412 are then deposited or otherwise placed against each polished side of the fiber 400, as shown. The length on this device (in the direction perpendicular to the page) is a few mm to a few cm or longer. It can be made into a modulator as is, in which case a large external field is applied to it, either DC plus AC, or AC only, as already described herein.

Alternatively, the device of FIG. 4 may comprise a poled fiber. In this case, the fiber 400 may be first poled, either thermally or with UV radiation. For example, with thermal poling the structure is heated to the right temperature (280° C. to 450° C.) and a large DC voltage is applied to the electrodes 410, 412 (a few thousands to tens of thousands of volts) for a certain amount of time (a few minutes to tens of minutes), following procedures well-known in the art. Since this technique calls for the application of a large external field, one must avoid the dielectric breakdown of air between the electrodes 410 and 412. This is the reason for placing the electrical insulator 404 on the sides of the fiber 400—doing so increases the air path between the edges of the electrodes 410 and 412. Similarly, in the direction perpendicular to the page, the electrodes 410 and 412 must be sufficiently recessed from the ends of the polished regions to provide a long enough air path that dielectric breakdown is precluded. The breakdown voltage of air decreases with increasing temperature, so that for high poling temperatures (e.g., for example 300° C. or higher), it may be necessary to pole in a vacuum. After poling, the fiber 400 exhibits a built-in electric field that extends under the anode (top electrode) into and through the fiber core 402. The modulator 390 then consists of the device shown in FIG. 4, with an AC voltage applied between the electrodes 410 and 412. In addition to this AC voltage, a DC voltage may also be applied between the electrodes 410 and 412 to enhance the DC field intrinsic to the poled fiber 400.

Figure 5:
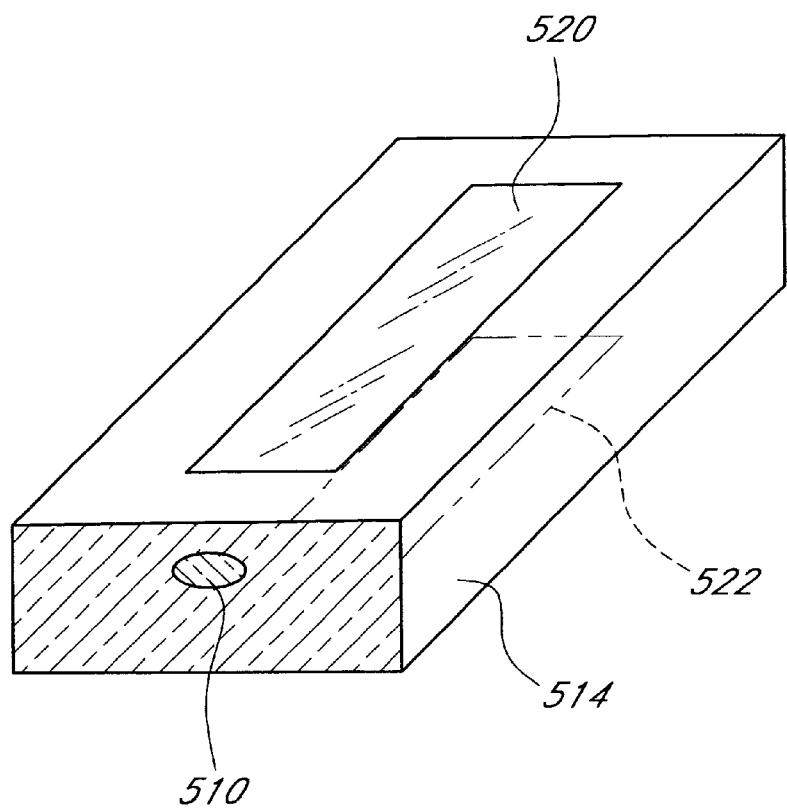
FIG. 5 illustrates an embodiment of the present invention based upon integrated optic technology.
Figure 6:
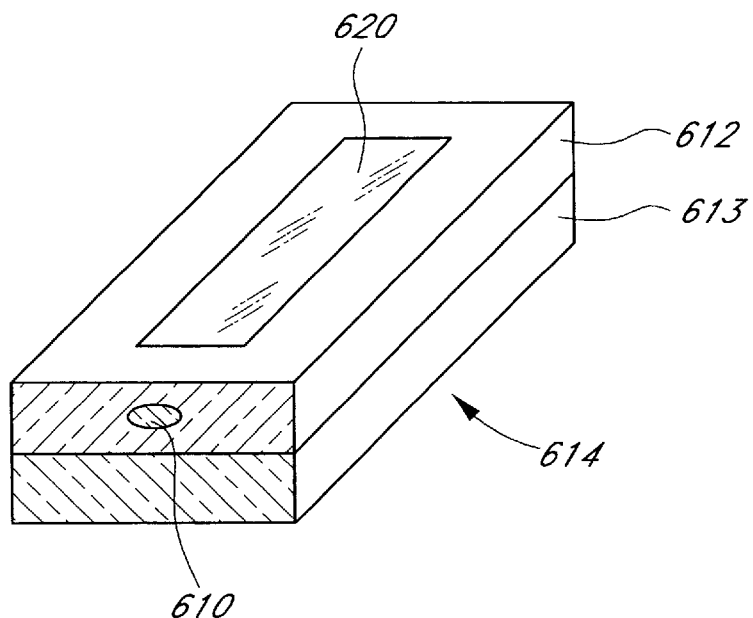
FIG. 6 illustrates an alternative embodiment of the present invention based upon integrated optic technology.

FIGS. 5 and 6 show two similar structures based on integrated optic technology. The structures comprise respective waveguides 510 and 610, fabricated in either a silica wafer 514 (FIG. 5), or a silica (612) on silicon (613) wafer 614 (FIG. 6), by any number of well-known fabrication techniques. In FIG. 5, two electrodes 520, 522 are deposited or otherwise placed on either surface of the wafer 514, on top of and below the waveguide portion 510. In FIG. 6, the silicon substrate 613 acts as the ground electrode, and only one other electrode 620 is used, namely, electrode 620 on top of the waveguide 610. Ideally, the waveguide 610 is buried so that this top electrode 620 does not introduce ohmic loss to an optical signal traveling through the waveguide 610. Other electrode configurations are also possible, for example, placing both electrodes on top of the wafer 514 or the wafer 612, with one electrode being placed on the right hand side of the waveguide and the other electrode being placed on the left hand side (not shown)—in this case electrically insulating material is preferably placed between the electrodes to prevent arcing. The applications described in connection with the embodiment of FIG. 4 also apply to the structure of FIGS. 5 and 6, bearing in mind the same concern that the electrodes 520, 522, 620 must be carefully designed to avoid dielectric breakdown of air during poling (if applicable) and/or during operation of the device as a phase modulator.

Any of the phase modulators described in this disclosure can be used to make an amplitude modulator by placing the phase modulator in an optical interferometer, of which many configurations exist. Specifically, the phase modulator may be placed in one of the arms of the interferometer. The phase of the signal traveling in this arm is modulated, whereas the phase of the signal traveling in the other arm is not modulated. These signals interfere at the output of the interferometer where the signals from the two arms are recombined, and the output signal amplitude is modulated.

Figure 7:
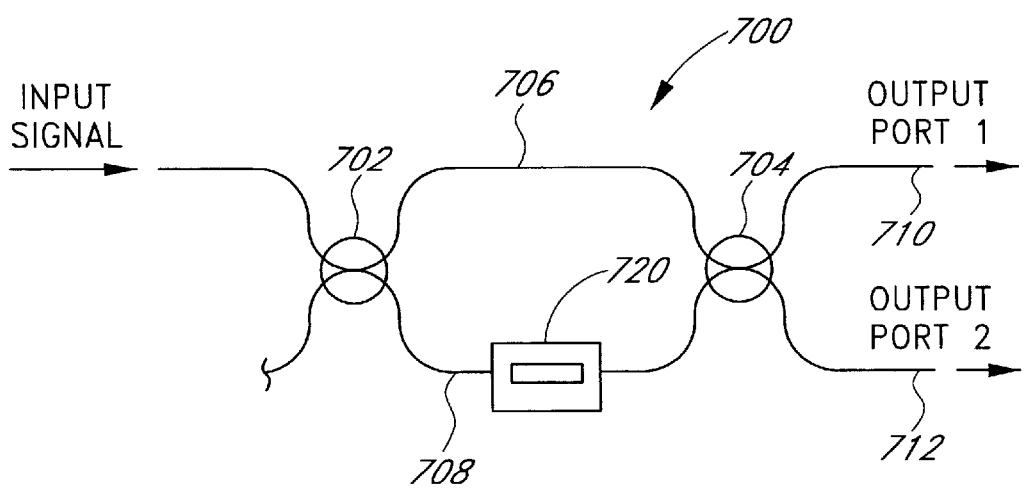
FIG. 7 illustrates a Mach-Zehnder interferometer amplitude modulator incorporating a phase modulator in accordance with the present invention.

Likewise, the same interferometer can be used to make a switch, simply by applying a voltage pulse to the phase modulator. Since the resonance limits the bandwidth of the modulator, one can apply a voltage pulse with a width, rise time and fall time that are limited to the vicinity of the reciprocal of the resonance frequency of the modulator. This concept is illustrated in FIG. 7 with a Mach-Zehnder interferometer 700 comprising a first coupler 702 and a second coupler 704 interconnecting two optical waveguides to form a first arm 706 and a second arm 708 between the two couplers 702, 704. A phase modulator 720 in accordance with the present invention is positioned in the second arm 708. When the interferometer 700 is used as an amplitude modulator, the signal power comes out alternatively at port 1 (710) and port 2 (712), switching continuously back and forth between these two ports at the frequency (or twice the frequency) applied to the phase modulator 720. The interferometer 700 can be constructed with fiber components, e.g., fused fiber couplers. Alternatively, the interferometer can be a monolithic integrated optic structure fabricated directly onto a planar wafer (silica, silica on silicon, or other materials) by a variety of well-known techniques. Other interferometers with which amplitude modulation or switching operations can be performed include Sagnac and Michelson interferometers.

Although preferred embodiments of the present invention have been described in detail above, it will be understood by those of ordinary skill in the art that certain obvious modifications and departures from the embodiments described herein can be made without departing from the spirit or essential characteristics of the invention.

What is claimed is:

1. An apparatus for modulating the phase of an optical signal, comprising:

an unpoled optical medium for propagating the optical signal, the unpoled optical medium having an index of refraction responsive to strains in the optical medium;

a first electrode proximate to said unpoled optical medium; and a second electrode proximate to said unpoled optical medium, said first and second electrodes having an AC voltage imposed therebetween, said AC voltage producing strains in said optical medium, thereby varying the index of refraction of said optical medium through the electrostrictive effect, wherein the phase of the optical signal is modulated such that polarization components of the optical signal parallel to and orthogonal to the electric field experience an equal phase shift.

2. The apparatus of claim 1, wherein said electrodes have a DC voltage applied thereto, said AC and DC voltages altering the phase modulation of an optical signal propagating through said optical medium.

3. The apparatus of claim 1, wherein said medium has first and second surfaces, said first and second electrodes being attached to said first and second surfaces, respectively.

4. An apparatus for modulating the amplitude of an optical signal, comprising:
   an interferometer that has first and second optical paths for propagating respective first and second portions of the optical signal and that combines the first and second portions of the optical signal into a combined optical signal;
   an unpoled optical medium positioned in at least the first optical path for propagating at least the first portion of the optical signal, the unpoled optical medium having an index of refraction responsive to strains in the optical medium;
   a first electrode proximate to said unpoled optical medium; and
   a second electrode proximate to said unpoled optical medium, said first and second electrodes having an AC voltage imposed therebetween, said AC voltage producing strains in said optical medium, thereby varying the index of refraction of said optical medium through the electrostrictive effect, wherein the phase of at least the first portion of the optical signal is shifted to cause modulation of the amplitude of the combined optical signal.

5. The apparatus of claim 4, wherein said electrodes have a DC voltage applied thereto, said AC and DC voltages altering the phase modulation of an optical signal propagating through said optical medium.

6. The apparatus of claim 4, wherein said medium has first and second surfaces, said first and second electrodes being attached to said first and second surfaces, respectively.

7. An apparatus for switching an optical signal, comprising:
   an interferometer that has first and second optical paths for propagating respective first and second portions of the optical signal and that combines the first and second portions of the optical signal into a combined optical signal at an output port;
   an unpoled optical medium positioned in at least the first optical path for propagating at least the first portion of the optical signal, the unpoled optical medium having an index of refraction responsive to strains in the optical medium;
   a first electrode proximate to said unpoled optical medium; and
   a second electrode proximate to said unpoled optical medium, said first and second electrodes having an AC voltage imposed therebetween, said AC voltage producing strains in said optical medium, thereby varying the index of refraction of said optical medium through the electrostrictive effect, wherein the phase of at least the first portion of the optical signal is shifted to cause the combined optical signal to be selectively switched to the output port.

8. The apparatus of claim 7, wherein said electrodes have a DC voltage applied thereto, said AC and DC voltages altering the phase modulation of an optical signal propagating through said optical medium.

9. The apparatus of claim 7, wherein said medium has first and second surfaces, said first and second electrodes being attached to said first and second surfaces, respectively.

10. An apparatus for modulating the phase of an optical signal, comprising:
    a poled optical medium for propagating the optical signal, the poled optical medium having an internal DC field and having an index of refraction responsive to strains in the poled optical medium; and
    at least first and second electrodes in proximity to the poled optical medium, the electrodes having an AC voltage applied thereto to induce an AC electric field within the poled optical medium to produce stains in the poled optical medium, thereby varying the index of refraction of the poled optical medium through the electrostrictive effect, wherein the phase of the optical signal is modulated such that polarization components of the optical signal parallel to and orthogonal to the electric field experience an equal phase shift.

11. The apparatus of claim 10, wherein the poled optical medium includes a substrate, the substrate comprising one of the electrodes.

12. The apparatus of claim 10, wherein the electrodes have a DC voltage applied thereto to enhance the DC field within the poled optical medium.

13. An apparatus for modulating the amplitude of an optical signal, comprising:
    an interferometer that has first and second optical paths for propagating respective first and second portions of the optical signal and that combines the first and second portions of the optical signal into a combined optical signal;
    a poled optical medium positioned in at least the first optical path for propagating at least the first portion of the optical signal, the poled optical medium having an internal DC field and having an index of refraction responsive to strains in the poled optical medium; and
    at least first and second electrodes in proximity to the poled optical medium, the electrodes having an AC voltage applied thereto to induce an AC electric field within the poled optical medium to produce stains in the poled optical medium, thereby varying the index of refraction of the poled optical medium through the electrostrictive effect, wherein the phase of at least the first portion of the optical signal is shifted to cause modulation of the amplitude of the combined optical signal.

14. The apparatus of claim 13, wherein the poled optical medium includes a substrate, the substrate comprising one of the electrodes.

15. The apparatus of claim 13, wherein the electrodes have a DC voltage applied thereto to enhance the DC field within the poled optical medium.

16. An apparatus for switching an optical signal, comprising:
    an interferometer that has first and second optical paths for propagating respective first and second portions of the optical signal and that combines the first and second portions of the optical signal into a combined optical signal at an output port;
    a poled optical medium positioned in at least the first optical path for propagating at least the first portion of the optical signal, the poled optical medium having an internal DC field and having an index of refraction responsive to strains in the poled optical medium; and
    at least first and second electrodes in proximity to the poled optical medium, the electrodes having an AC voltage applied thereto to induce an AC electric field within the poled optical medium to produce stains in the poled optical medium, thereby varying the index of refraction of the poled optical medium through the electrostrictive effect, wherein the phase of at least the first portion of the optical signal is shifted to cause the combined optical signal to be selectively switched to the output port.

17. The apparatus of claim 16, wherein the poled optical medium includes a substrate, the substrate comprising one of the electrodes.

18. The apparatus of claim 16, wherein the electrodes have a DC voltage applied thereto to enhance the DC field within the poled optical medium.

19. A method of modulating the phase of an optical signal, comprising:

providing an optical medium having an index of refraction responsive to strains in the optical medium;

applying an AC voltage to produce an electric field within the optical medium;

producing variations in the index of refraction of the optical medium through the electrostrictive effect by causing strains in the optical medium; and passing an optical signal through the optical medium to modulate the phase of the optical signal, the AC voltage being applied at a frequency such that polarization components of the optical signal parallel to and orthogonal to the electric field experience an equal phase shift as the optical signal passes through the optical medium.

20. The method of claim 19, wherein the AC voltage is applied to first and second electrodes in proximity to the optical medium.

21. The method of claim 20, further comprising applying a DC voltage to the electrodes.

22. The method of claim 21, wherein the optical medium is unpoled.

23. The method of claim 21, wherein the optical medium is poled.

24. The method of claim 19, wherein the optical medium is poled.

25. The method of claim 19, wherein the optical medium is unpoled.

26. The method of claim 19, comprising attaching the first and second electrodes to at least one surface of the optical medium.

27. A method of modulating the amplitude of an optical signal, comprising:

providing an optical medium having an index of refraction responsive to strains in the optical medium;

applying an AC voltage to produce an electric field within the optical medium;

producing variations in the index of refraction of the optical medium through the electrostrictive effect by causing strains in the optical medium; and passing an optical signal through the optical medium to modulate the phase of the optical signal; and directing output from the optical medium into an interferometer to modulate the amplitude of the optical signal.

28. The method of claim 27, wherein the AC voltage is applied to first and second electrodes in proximity to the optical medium.

29. The method of claim 28, further comprising applying a DC voltage to the electrodes.

30. The method of claim 29, wherein the optical medium is unpoled.

31. The method of claim 29, wherein the optical medium is poled.

32. The method of claim 27, wherein the optical medium is poled.

33. The method of claim 27, wherein the optical medium is unpoled.

34. The method of claim 27, comprising attaching the first and second electrodes to at least one surface of the optical medium.

35. A method of switching an optical signal, comprising:

providing an optical medium having an index of refraction responsive to strains in the optical medium;

applying an AC voltage to produce an electric field within the optical medium;

producing variations in the index of refraction of the optical medium through the electrostrictive effect by causing strains in the optical medium; and passing an optical signal through the optical medium to modulate the phase of the optical signal; and directing output from the optical medium into an interferometer to switch the optical signal from a first output port of the interferometer to a second output port of the interferometer.

36. The method of claim 35, wherein the AC voltage is applied to first and second electrodes in proximity to the optical medium.

37. The method of claim 36, further comprising applying a DC voltage to the electrodes.

38. The method of claim 37, wherein the optical medium is unpoled.

39. The method of claim 37, wherein the optical medium is poled.

40. The method of claim 35, wherein the optical medium is poled.

41. The method of claim 35, wherein the optical medium is unpoled.

42. The method of claim 35, comprising attaching the first and second electrodes to at least one surface of the optical medium.

* * * * *